March 28, 1967 R. SOMAN 3,311,066
APPARATUS FOR USE WITH PRESSES AND THE LIKE
Original Filed July 11, 1962 6 Sheets-Sheet 1
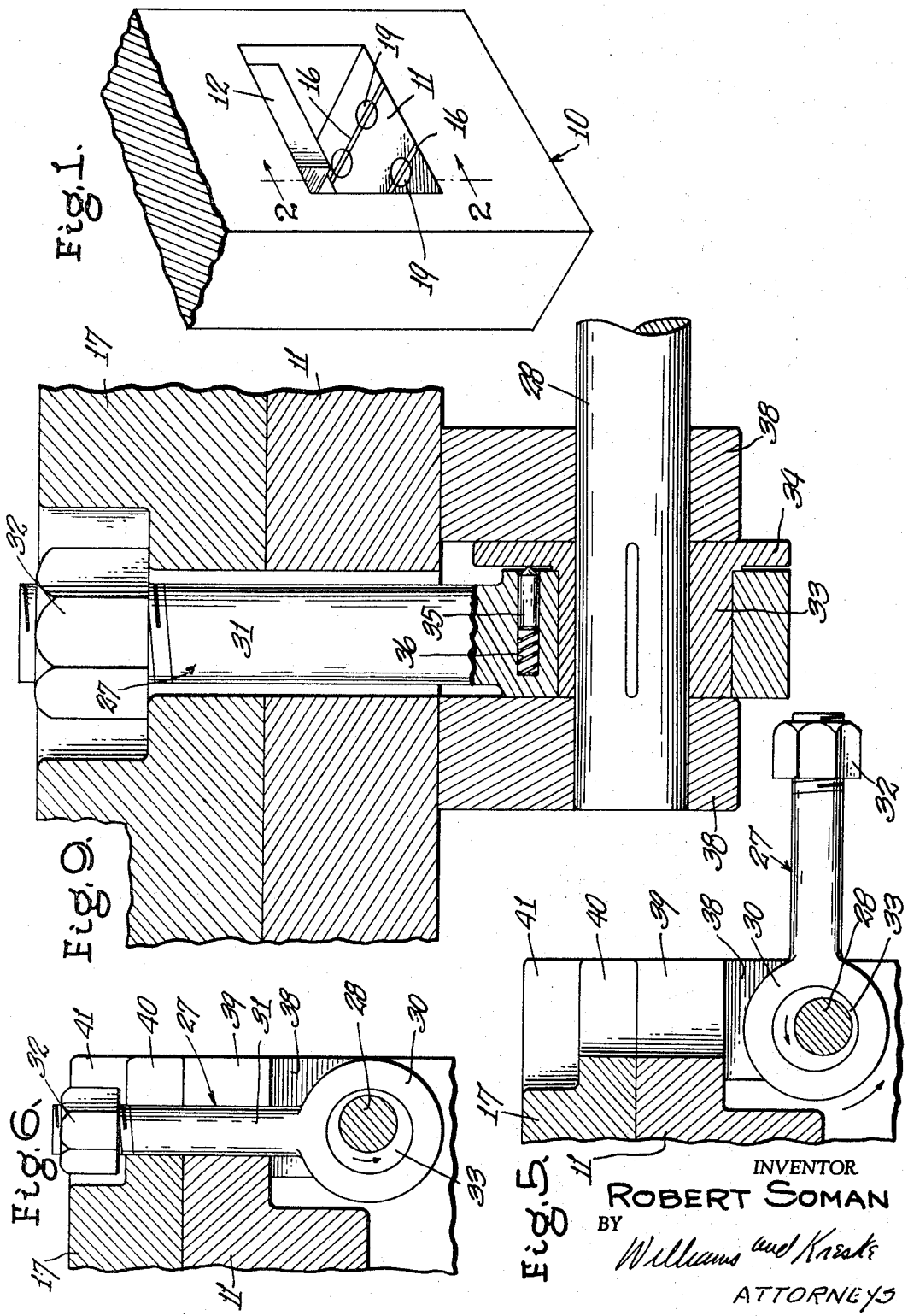
INVENTOR.
ROBERT SOMAN
BY Williams and Kreske
ATTORNEYS

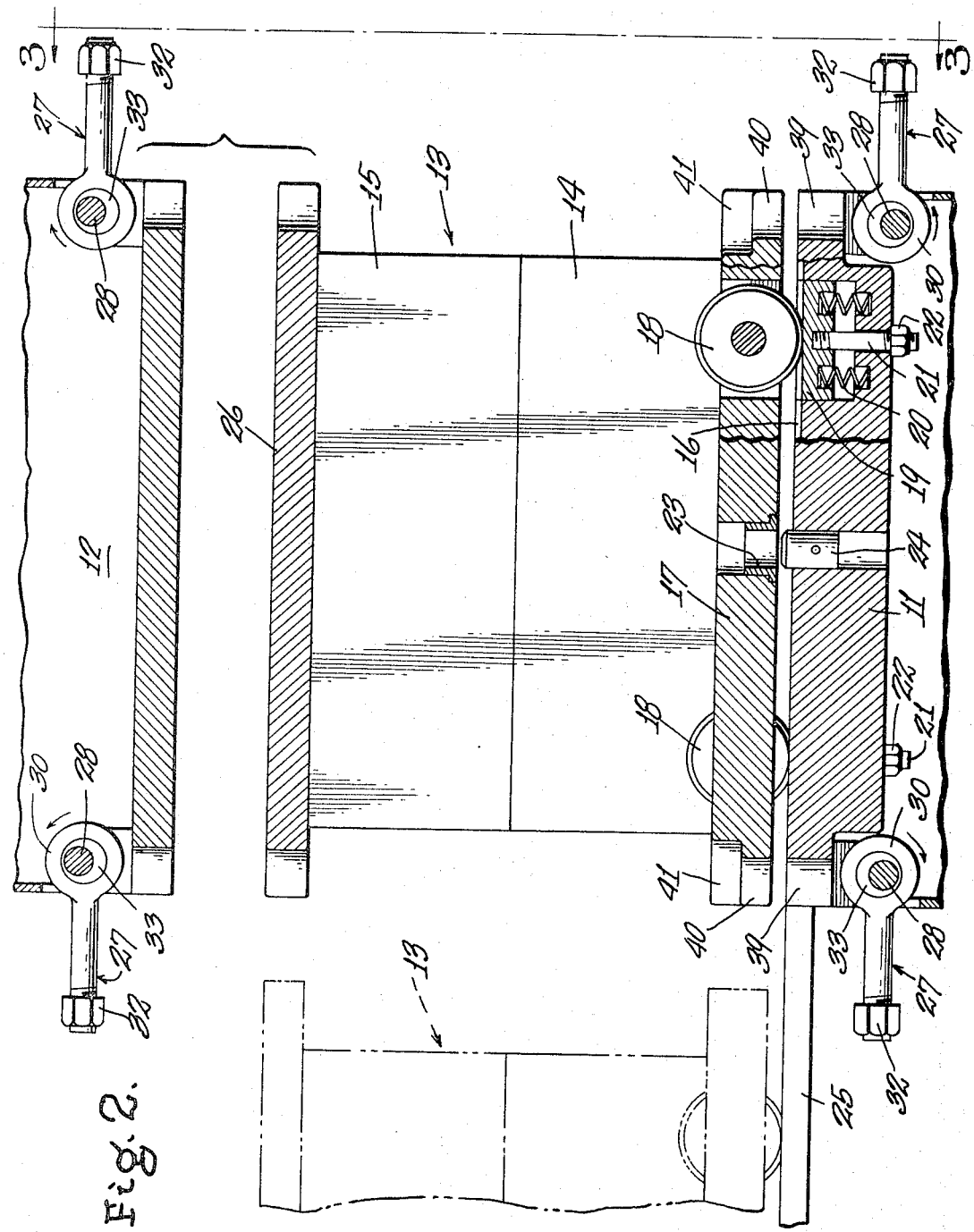

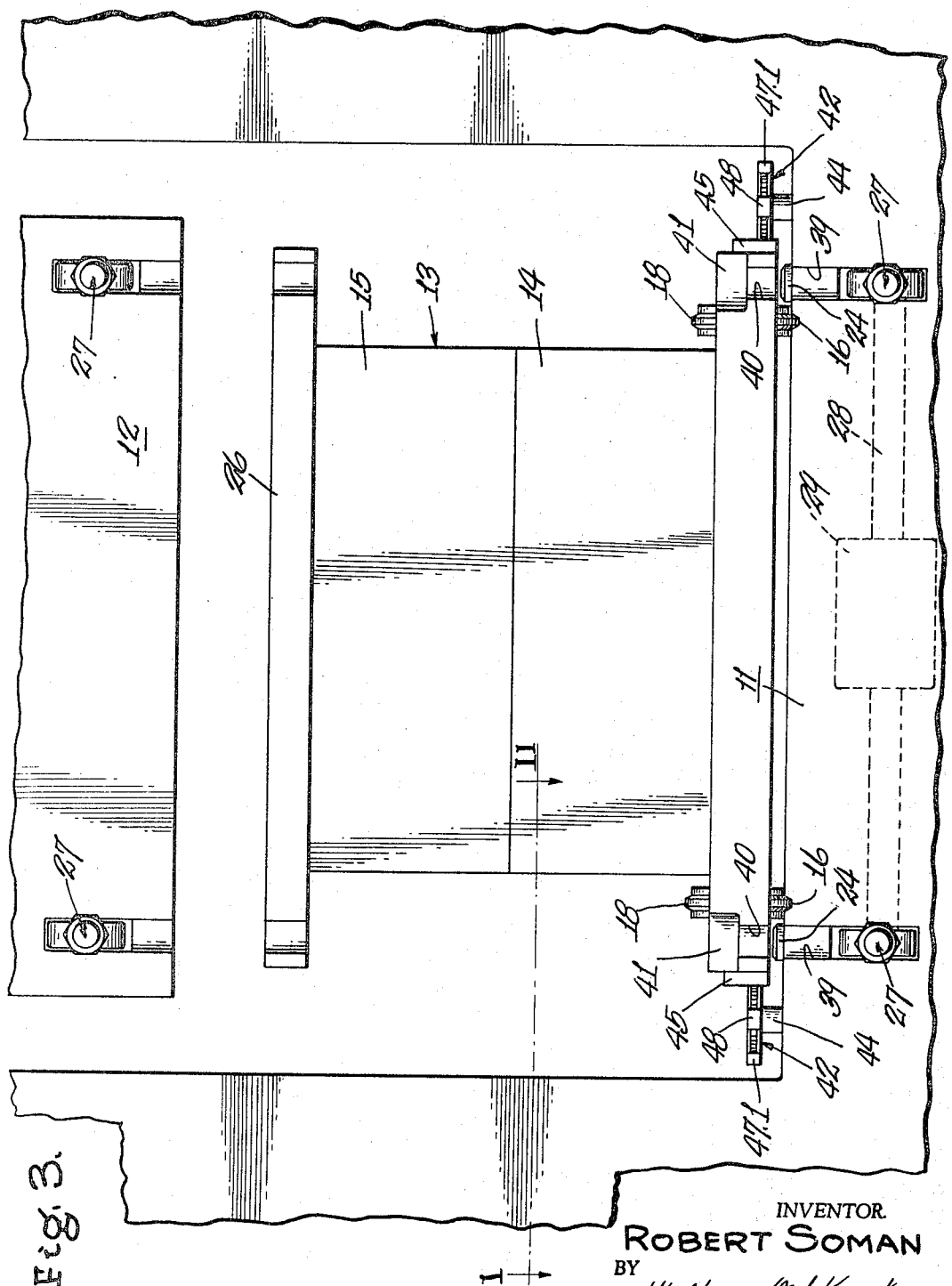

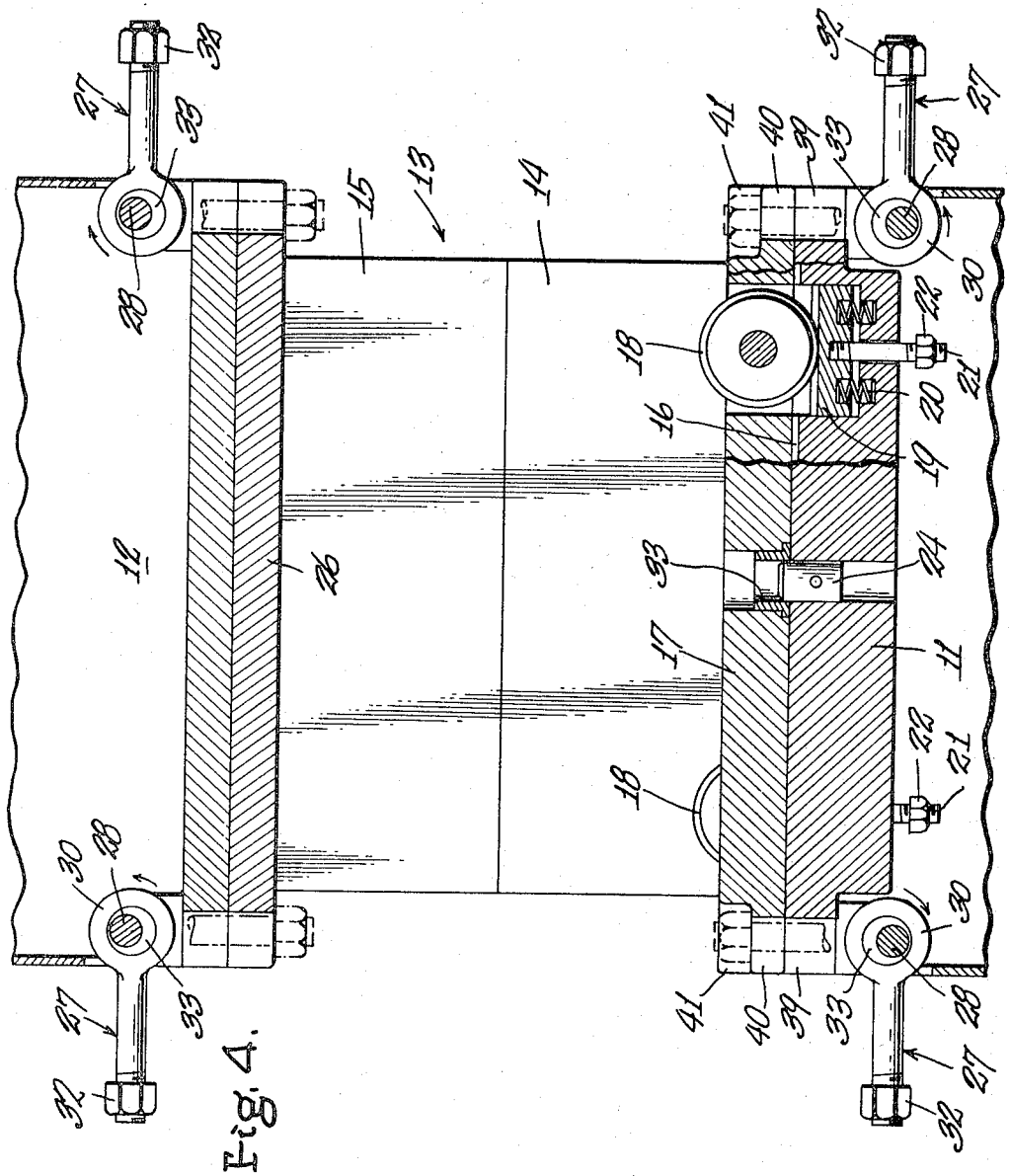

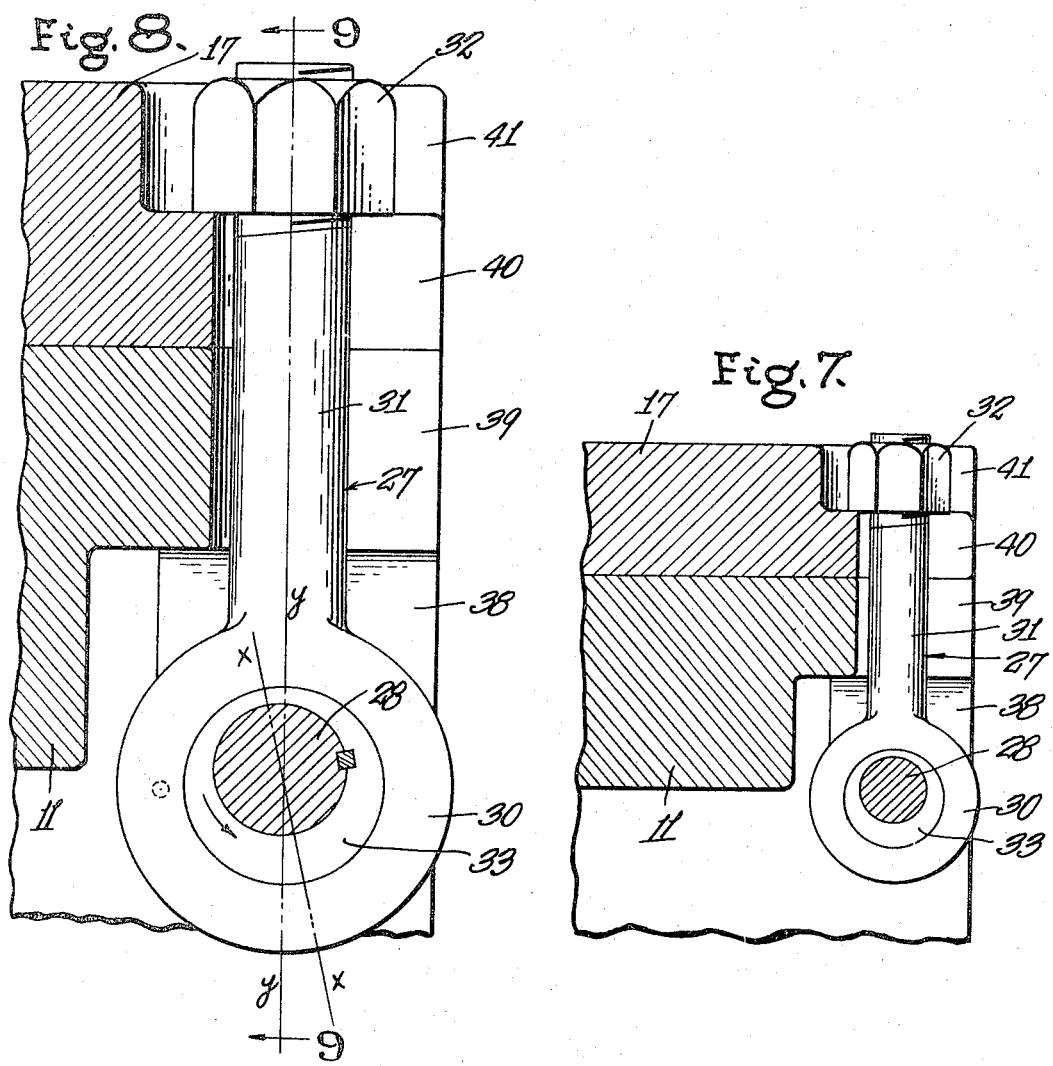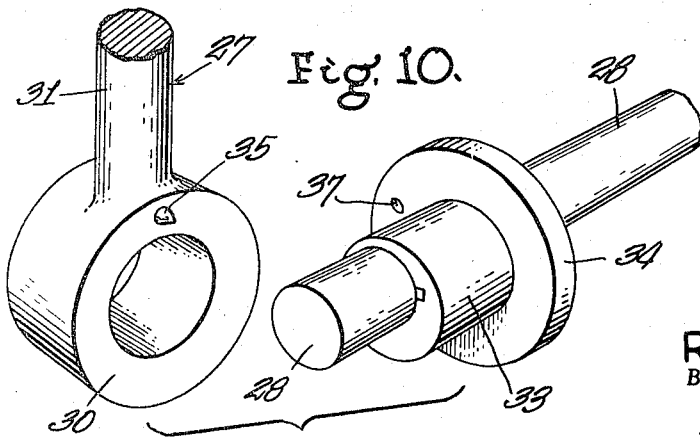

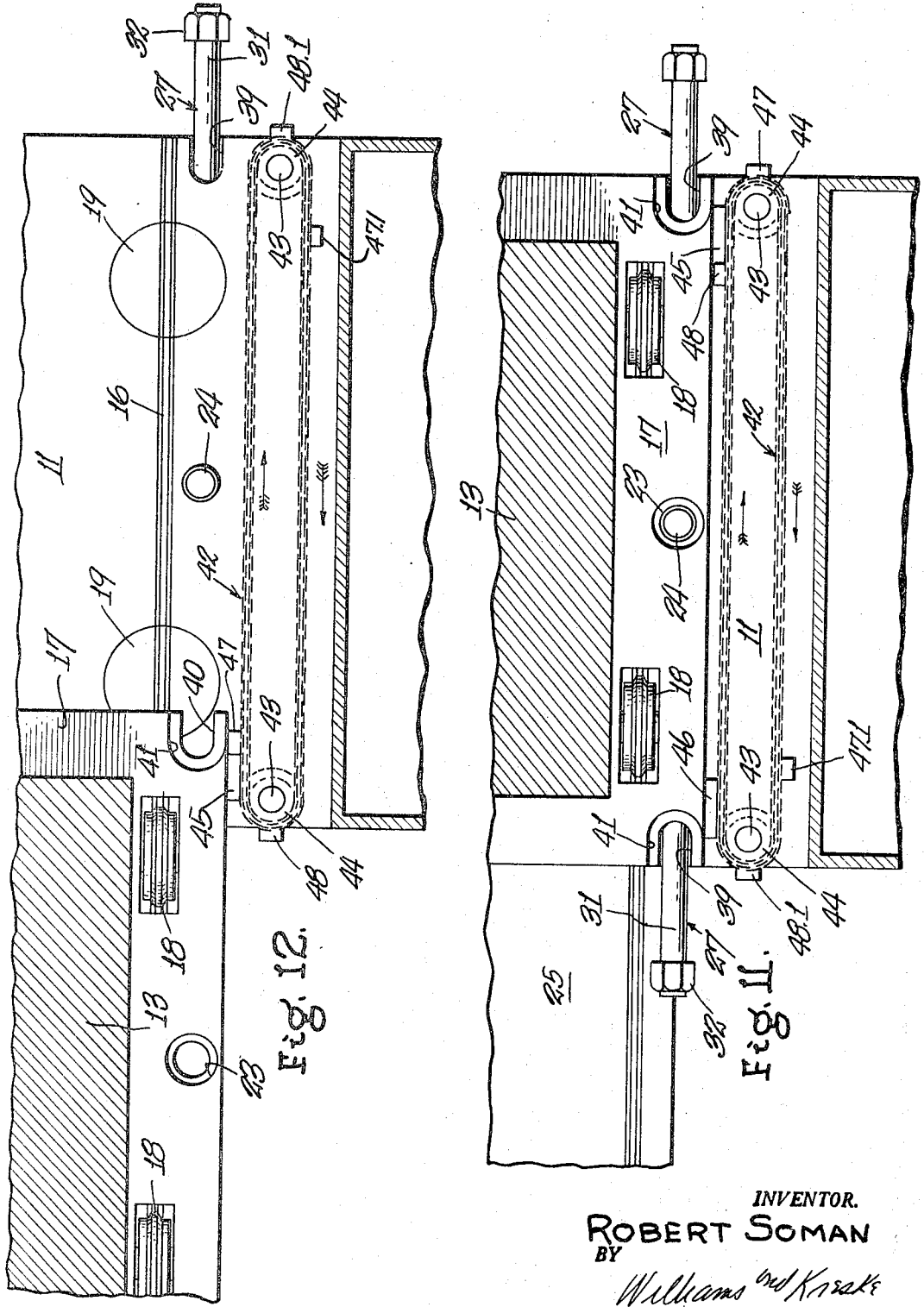

United States Patent Office 3,311,066
Patented Mar. 28, 1967

3,311,066
APPARATUS FOR USE WITH PRESSES AND THE LIKE
Robert Soman, Warren, Ohio, assignor to The McKay Machine Company, Warren, Ohio
Original application July 11, 1962, Ser. No. 209,151, now Patent No. 3,229,791, dated Jan. 18, 1966. Divided and this application Feb. 9, 1965, Ser. No. 438,150
2 Claims. (Cl. 104—172)

This application is a division of application Ser. No. 209,151, filed July 11, 1962, now Patent No. 3,229,791, granted Jan. 18, 1966.

The present invention relates to apparatus for use with presses and the like, more particularly to apparatus for use with presses embodying large and heavy die sets which must frequently be removed from the press and be replaced by other die sets, and the principal object of the invention is to provide new and improved apparatus of the character described.

While the mounting of a large die set between the jaws of a press is normally a time-consuming operation, this is usually not a serious problem when the die set is used for long production runs. Where, however, the press must be run with minimum down time for maximum production, but where the die set may require replacement at frequent intervals, as for changing the size or type of the parts produced thereby, quite a serious problem is presented. Under such circumstances, the normal procedure of hoisting the die set in place between the jaws of the press, properly locating it, and then bolting it in position, is far too slow and is far too costly in lost production time.

The present invention, therefore, is designed to minimize the delay attendant with removing a large die set from a press and the like and replacing it with another die set. Other advantages will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a fragmentary, perspective view of a press incorporating apparatus of the present invention, FIGURE 2 is an enlarged, fragmentary sectional view generally corresponding to the line 2—2 of FIGURE 1, FIGURE 3 is a fragmentary elevational view generally corresponding to the line 3—3 of FIGURE 2, FIGURE 4 is a view similar to FIGURE 2 but showing certain parts in other positions, FIGURE 5 is an enlarged, fragmentary view of a portion of the apparatus seen in FIGURE 4, FIGURES 6 and 7 are views similar to FIGURE 5 but showing certain parts in other positions, FIGURE 8 is a view similar to FIGURE 7 but still further enlarged, FIGURE 9 is a fragmentary sectional view generally corresponding to the line 9—9 of FIGURE 8, FIGURE 10 is a fragmentary, exploded perspective view of details seen in FIGURE 9, FIGURE 11 is a fragmentary sectional view generally corresponding to the line 11—11 of FIGURE 3, and FIGURE 12 is a view similar to FIGURE 11 but with certain parts in other positions.

With reference to FIGURE 1, there is fragmentarily shown a press structure 10 of any conventional design having a bed 11 and a ram 12. Suitable mechanism, not shown, may be employed to effect movement of the ram 12 toward and away from the press bed 11.

Disposed between the bed 11 and the ram 12, as viewed in full lines in FIGURE 2, is a die 13 of any suitable type. Such die comprises a lower portion 14 and an upper portion 15, the former being adapted to be secured to the press bed and the latter to the press ram in a manner to be disclosed. As best seen in FIGURES 1, 2 and 3, spaced, parallel grooves 16 are formed in the bed 11 for a purpose to appear.

As previously mentioned, one of the features of the invention is the provision of means facilitating the shifting of the die 13 toward and away from operable engagement with the press. To this end, die 13 is securely mounted on a carriage 17 having flanged wheels 18 which are cooperable with the press bed grooves 16 to guide carriage movement.

Formed in the press bed 11 in register with each carriage wheel 18 when the carriage is properly located on the press is a vertically shiftable disk 19 best seen in FIGURE 2. Each disk carries a continuation of one of the grooves 16 aforesaid and each is resiliently biased to the position shown by means of springs 20. A stud 21 is anchored to the disk and carries a nut 22 which limits upward movement of the disk so that, in its upwardly biased position, it forms a continuation of the bed. Springs 20 are of sufficient strength that they will not be debected by the weight of the carriage-die assembly.

On each side of the carriage 17, outboard of the wheels 18, the carriage carries bushings 23 to closely fit with respective upwardly projecting pins 24 anchored in the press bed. As illustrated, such pins are low enough so that the carriage may roll along the bed grooves 16 without interference therefrom.

With the construction thus far described, operation will be as follows: Carriage 17, with the die 13 mounted thereon, will be rolled on to the press bed 11 from its phantom-line position on means 25 (FIGURE 2), which means provides a suitable track for the carriage. Preferably, means 25 will have grooves formed therein which are identical to and aligned with the grooves 16 in the press bed. With the carriage 17 in its full-line position seen in FIGURE 2; that is, with the carriage bushings 23 generally in registry with respective pins 24, the ram 12 will be lowered to engagement with a plate 26 which is secured to the upper die part 15. The ram will be further lowered, compressing the disk springs 20, until such time as the underside of the carriage abuts the upper surface of the press bed 11 as shown in FIGURE 4. As the carriage is forced down against the springs 20, the pins 24 will enter respective bushings 23 to insure accurate location of the carriage and thus accurate location of the die within the press. Following this, the die will be locked to the press by means next to be disclosed.

As viewed in FIGURE 2, a plurality of tension members 27 are carried by the press bed 11 and the press ram 12 and, since all are similar, only one need be described in detail. With respect to FIGURE 3, a pair of tension members 27 are carried by the press bed at the near side of the die with another pair being carried directly above them by the press ram 12. Similar pairs of tension members are carried by the press bed and press ram respectively at the far side of the die.

Each pair of tension members is carried by a shaft; for example, the lower tension members seen in FIGURE 3 being carried by a shaft 28 which is adapted to be rotated in a manner to be described by a motor unit 29. Each pair of tension members has its own shaft as can be seen in FIGURES 2 and 4.

With reference to FIGURES 5 through 9, the tension member 27 shown therein has a ring-like base portion 30, a threaded shank portion 31, and a nut 32 threaded upon the shank portion 31 and forming a head for a purpose to appear. With particular reference to FIGURES 9 and 10, an eccentric 33 is keyed or otherwise secured to the shaft 28 and has an integral, radially outwardly projecting collar 34. Eccentric 33 is proportioned to closely fit within the central aperture of the tension member portion 30 with the latter closely adjacent the eccentric collar 34.

Seated in a bore in the side of member portion 30 facing the eccentric collar 34 is a pointed-end plunger 35 urged outwardly by means of a spring 36. Collar 34 (see FIGURE 10) has a shallow recess 37 into which the pointed end of the plunger will be forced by its spring when such recess is in register with the plunger for a purpose to appear. As clearly shown in FIGURE 9, shaft 28 is rotatably carried by spaced brackets 38 affixed to the press bed.

With the parts positioned as seen in FIGURE 5 and in full-lines in FIGURE 4, it will be noted that eccentric 33 is offset to the upper side of shaft 28 and that the tension member 27 projects horizontally outwardly of the press bed. Although not shown, the previously described plunger 35 will be sprung to seated relation in the eccentric roller recess 37 so as to lock the eccentric and the tension member together for unitary rotation.

Shaft 28 will now be rotated in the direction of the arrow seen in FIGURE 5 thus causing simultaneous rotation of the tension member. Upon approximately ninety degrees rotation of the shaft 28, the latter will assume the position seen in FIGURE 6 with the tension member shank portion 31 within slots 39 and 40 respectively formed in the press bed 11 and the carriage 17. Note that the tension member nut, or head 32 is spaced slightly above the bottom of a pocket 41 formed in the carriage.

Upon continued movement of the shaft 28 in the direction of the arrow, the plunger 35 will be forced out of its recess 37 in the eccentric collar since the bed slot 39 prevents any further rotation of the tension member in the direction of the arrow. With the tension member thus prevented from rotating, continued rotation of the eccentric 33 to a position off-set beneath the shaft 28 will bodily lower the tension member and draw the tension member nut 32 tightly against the bottom of the carriage pocket 41 as shown in FIGURES 7 through 9 and in phantom in FIGURE 4. This will, of course, securely clamp the carriage to the press bed. It will be understood that once the proper position of the nut 32 on the tension member shank 31 has been determined at assembly to exert the desired clamping pressure, the nut may be permanently locked in place by welding it to the shank or by any other suitable expedient.

While it would be possible to lock the shaft 28 in the position shown in FIGURE 7 by means of a suitable brake or other locking device which could be formed as part of the motor unit 29, this is presently considered impractical and excessively costly. Instead, the following is employed to effect such function. As viewed in FIGURE 8, the eccentric 33 has been rotated in the direction of the arrow slightly beyond its maximum, downwardly off-set position. This is illustrated by the exaggerated angularity between the plane X—X which passes through the center of the eccentric 33 and the center of its shaft 28 and the plane Y—Y which is parallel with the tension member axis. Stated another way, the shaft 28 is rotated in the direction of the arrow slightly beyond a position wherein maximum tension is exerted on the tension member. Further rotation of the shaft 28 in the direction of the arrow is prevented since this is the limit of motor travel in this direction while reverse movement will be prevented since the heavy tension present in the tension member tends to rotate the shaft in the direction of the arrow and not in the opposite direction. Thus, the arrangement of the eccentric functions as a toggle locking device so that once the shaft 28 has been shifted to the position seen in FIGURES 7 and 8, the shaft-rotating motor unit 29 may be deactivated until such time as the carriage is to be released.

To release the carriage, as when the die is to be removed from the press, it is only necessary to reverse the direction of drive of the motor unit 29. With the shaft 28 thus rotated by the motor unit in the reverse direction, initial movement thereof will cause the tension member nut 32 to move away from the bottom of the carriage pocket 41 to thus release the carriage. After approximately 90° rotation of the shaft in this reverse direction, the plunger 35 will spring into the eccentric collar pocket 37 so that the continued reverse rotation of the shaft will shift the tension member from its vertical position to the position shown in FIGURES 3 and 5.

While but one tension member has been described in detail, it will be understood that each will operate in a similar manner to secure the die in position and to release the same. It will also be understood that the tension members carried by the press ram 12 function to clamp the die plate 26 to the ram.

With the carriage 17 clamped to the press bed 11 by the lower tension members and with the die plate 26 clamped to the press ram 12 by the upper tension members as shown in FIGURE 4 with the tension members in their phantom-line positions, the press ram may now be elevated to separate the upper and lower die portions 15, 14 respectively to thus permit the insertion therein of workpiece upon which the die is designed to work when the ram descends.

When the die is to be removed from the press, it is only necessary to bring the press ram to the position seen in FIGURE 4, to shift the tension members to their full-line positions, and to then elevate the ram as seen in FIGURE 2. The disk springs 20 will thereupon raise the die to the position seen in FIGURE 2 so that the carriage and its attached die may be rolled from the press.

As previously mentioned, die 13 may be of considerable size and weight; accordingly, means are provided to facilitate shifting of the die toward and away from its position on the press. To this end, a pair of chains are provided, one on each side of the path along which the die travels toward and away from its position in the press. As seen in FIGURES 11 and 12, and wherein but one side of the structure is shown in the interest of simplicity, a roller chain 42 is looped over two sprockets 44 to provide a chain reach closely adjacent the side of the carriage. Each sprocket is carried by a spindle 43 rotatably carried by the press bed 11, the spindles being suitably driven by any conventional means which have not been shown.

Projecting from the carriage 17 are abutments 45, 46 and carried by the chain 42 are spaced-apart transversely projecting lugs 47, 48. Also carried by the chain 42 in diametrically opposed relation with the lugs 47, 48 are identical lugs 47.1, 48.1. As illustrated in FIGURE 3, an identical arrangement of a chain, lugs, and the like is provided at the opposite side of the carriage. Preferably, all of the sprocket spindles will be interconnected so that both chains 42 may be shifted in phased relationship.

In operation and with both chains positioned as seen in FIGURE 12, carriage 17 will be disposed as shown with its abutments 45 adjacent the near reach of the adjoining chain. If sprockets 43 are now rotated to shift chains 42 in the direction of the arrows, chain lugs 47 will engage their carriage abutments 45 to thus shift the carriage to the right. When the carriage is correctly positioned as seen in FIGURE 11, sprocket rotation will be terminated whereupon the die may be clamped in position as earlier disclosed.

When the die is to be shifted from the position seen in FIGURE 11, sprocket rotation may be reversed thus carrying lugs 48 into engagement with abutments 45 to thereby return the carriage to the left to the position seen in FIGURE 12. Alternatively, carriage 17 may also be shifted from the position seen in FIGURE 11 to the right, if desired, assuming, of course, that means similar to 25 provides a track for the carriage on the right side of the press structure. In this event, sprocket rotation will be continued in the direction first-mentioned thus moving the carriage to the right until lugs 47 pass around their right-hand sprockets 44 and disengage from behind their abutments 45. Continued sprocket movement will then carry lugs 48.1 into engagement with abutments 46 to further shift the carriage to the right until these lugs also pass around the right-hand sprockets 43 and disengage from behind their abutments 46. Clearly, merely by reversing the above operations, the carriage 17 may be shifted in the opposite direction from that described.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A transfer device for a press having a bed formed with a first track extending crosswise of said bed and aligned with a second track disposed at one side of said bed, a wheeled carriage to which a section of the press die is attached, said carriage being wheeled along said tracks between a position outside of said bed wherein said press die section may be repaired or changed, to a position within said press wherein said press die section is held in operating alignment with a complementary die section carried by the ram of said press, said first track having depressible portions vertically aligned with said carriage wheels when said carriage is in said operating alignment and operable to permit said carriage to be lowered relative to said bed, locking means engaged when said carriage is lowered to lock said carriage in said operating alignment, a chain movable about spaced sprockets which are rotatably carried by said bed, said chain having a reach adjoining one side of and being parallel to said first track, means for driving said chain in opposite directions, said carriage having an abutment and said chain having spaced lugs which are engageable with said abutment when moved along said chain reach, in one direction of chain movement one lug engaging one side of said abutment to drive said carriage in said one direction, and in the opposite direction of chain movement the other lug engaging the opposite side of said abutment to drive said carriage in said opposite direction.

2. The construction of claim 1 wherein a third track is disposed on the opposite side of said bed and is aligned with said first and second tracks, wherein said carriage is provided with two abutments spaced apart along the line of carriage movement, and wherein said chain has two corresponding sets of lugs, one set cooperable with one abutment and the other set cooperable with the other abutment, said lug sets and said abutments being relatively spaced so that one lug of one set will engage its respective abutment and drive said carriage along said first and second tracks from a position at said one side of said bed to position within said press, and the corresponding lug of the other set of lugs will engage its respective abutment and drive said carriage along said second and third tracks from position within said press to position at said opposite side of said bed.

References Cited by the Examiner

UNITED STATES PATENTS

| | | | |
|---|---|---|---|
| 1,799,641 | 4/1931 | Prouty et al. | 104—172 |
| 2,132,455 | 10/1938 | Bishop | 104—172 |
| 2,742,863 | 4/1956 | Burkitt | 104—172 |
| 3,058,433 | 10/1962 | Hurst | 104—172 |

ARTHUR L. LA POINT, *Primary Examiner.*

DRAYTON E. HOFFMAN, *Examiner.*